(12) United States Patent
Osawa et al.

(10) Patent No.: US 7,304,402 B2
(45) Date of Patent: Dec. 4, 2007

(54) CAR POWER SOURCE APPARATUS

(75) Inventors: Takeshi Osawa, Takasago (JP); Junya Yano, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 305 days.

(21) Appl. No.: 11/241,927

(22) Filed: Oct. 4, 2005

(65) Prior Publication Data

US 2006/0071557 A1    Apr. 6, 2006

(30) Foreign Application Priority Data

Oct. 5, 2004   (JP) .............................. 2004-292793

(51) Int. Cl.
*B60L 1/00*   (2006.01)
*H01H 47/00*   (2006.01)
(52) U.S. Cl. .................................. 307/10.1; 307/132 E
(58) Field of Classification Search .............. 307/10.1, 307/132 E
See application file for complete search history.

(56) References Cited

FOREIGN PATENT DOCUMENTS

JP           8-182115         7/1996

*Primary Examiner*—Michael Sherry
*Assistant Examiner*—Dru Parries
(74) *Attorney, Agent, or Firm*—Wenderoth, Lind & Ponack, L.L.P.

(57) ABSTRACT

The car power source apparatus switches a pair of contactors (driving battery relays) connected to positive and negative output sides of a driving battery via a switching circuit with an auxiliary battery as power supply. The switching circuit is provided with a voltage detection circuit to detect auxiliary battery voltage, a series switching circuit to connect coils of the pair of contactors in series and switch both contactor contacts on, and a parallel switching circuit to connect coils of the pair of contactors in parallel and switch both contactor contacts on. When auxiliary battery voltage is higher than a set voltage, it connects the pair of contactor coils in series to switch the contacts on via the series switching circuit, and when auxiliary battery voltage is lower than a set voltage, it connects the pair of contactor coils in parallel to switch the contacts on via the parallel switching circuit.

11 Claims, 3 Drawing Sheets

2·· CONTACTORS   2B·· NEGATIVE SIDE CONTACTOR
2a·· FIRST CONTACTOR   2b·· SECOND CONTACTOR

CAR POWER SOURCE APPARATUS

BACKGROUND OF THE INVENTION

1. Field of the Invention

This invention relates to a car power source apparatus with contactors (driving battery relays) connected to the output side of a driving battery that supplies power to an electric motor that drives the car.

2. Description of the Related Art

A power source apparatus intended for a car comprises a driving battery having high output voltage. This power source apparatus has contactors connected to positive and negative sides of its output. When the ignition switch is turned on to drive the car, the contactors are switched on. With the contactors switched on, the power source apparatus is in a state that allows it to supply power from the driving battery to the electric motor that drives the car. The contactors are switched off to cut-off current flow when the ignition switch is off and the car is stopped, or in case of an abnormality. This is to insure safety if a car crash occurs or maintenance is performed. A power source apparatus with contactors connected to the output side of the driving battery has been developed to realize the features described above (Japanese Patent Application Disclosure HEI 8-182115, 1996).

SUMMARY OF THE INVENTION

As cited in this prior art disclosure as well, a car power source apparatus with contactors connected to its output side, switches the contactors on and off via an automobile electrical system battery. For purposes of this patent application, the automobile electrical system battery will be referred to as the auxiliary battery, in contrast to the driving battery which provides power to the electric motor that drives the car. Almost all cars use a lead battery with a specified voltage of 12V as the automobile electrical system battery or auxiliary battery. Due to many factors, the voltage of an auxiliary battery can vary over a wide range, for example, 8V to 16V. Voltage becomes particularly low when the ignition switch is off and a large amount of power is consumed with no battery charging. For example, when the ignition switch is off and power consumption is high due to conditions such as headlight illumination, high air conditioner fan operation, or windshield wiper operation, auxiliary battery voltage will drop markedly. In particular, if the auxiliary battery has degraded, internal resistance has become high, and capacity has become low, voltage drop will become even greater. Further, if auxiliary battery performance decreases due to abnormally low external temperature, battery voltage will also drop. In contrast, when the ignition switch is turned on and the car is being driven, namely when the auxiliary battery is being charged, auxiliary battery voltage is comparatively stable. However, while voltage rises when charged by high current, even under these conditions if charge capacity is less than discharge capacity, auxiliary battery voltage will drop. With the ignition switch in the on state, auxiliary battery voltage is regulated by an on-board regulator in the car. The regulator detects auxiliary battery voltage, controls charging current, and regulates the voltage within a fixed voltage range. The regulator controls charging current to maintain auxiliary battery voltage at 13V to 15V. The fixed voltage range of the regulator is quite large, and transient voltages can be high when the regulator changes charging current. In addition, when high current is drawn while the charging current is small, charge capacity becomes less than discharge capacity, and auxiliary battery voltage can drop. In this fashion, auxiliary battery voltage varies over a wide range as a result of many factors.

The specified voltage for a contactor relay coil is set at the specified auxiliary battery voltage. Consequently, if the specified auxiliary battery voltage is 12V, contactor relay coil specified voltage is also set at 12V. If voltage varies to 75% of the specified 12V relay coil voltage, it becomes 9V. If contactor relay coil voltage drops below 9V, for example if it drops to 8V, the contactor can fail to switch properly. Conversely, if the 12V relay coil maximum tolerable voltage is 130%, it has a 15.6V maximum allowable voltage. Therefore, if 16V is supplied to the relay coil, it exceeds the maximum allowable voltage and failure is possible.

Since the range of auxiliary battery voltage variation exceeds the range of voltage that can be supplied to a contactor relay coil, prior art power source apparatus auxiliary battery output was regulated by a voltage regulator circuit, such as a PWM (pulse width modulation) type regulator, before supplying It to a relay coil. However, a voltage regulator circuit such as a PWM regulator circuit has the drawback that circuit structure is complex, the number of circuit elements is large, and cost is increased. In addition, since the PWM regulator circuit adjusts output voltage by adjusting switching device on and off duty cycle, there is concern that pulse noise may have a negative effect on other circuitry. Since noise can be a cause of car malfunction, it is important to limit noise to the extreme.

The present invention was developed with the object of solving these problems with prior art power source apparatus. Thus it is a primary object of the present invention to provide a car power source apparatus that can properly switch contactors on and off via an auxiliary battery with large voltage variation, while using an extremely simple circuit structure.

The car power source apparatus of the present invention is provided with a driving battery 1 having a plurality of batteries connected in series, a pair of contactors 2 that connect contacts to the positive and negative output sides of the driving battery 1, a switching circuit 4 that switches the pair of contactors 2 on and off, and an auxiliary battery 6 that activates contactor 2 coils to switch contactor 2 contacts on and off. The switching circuit 4 is provided with a voltage detection circuit 7 to detect auxiliary battery 6 voltage, a series switching circuit to connect the pair of contactor 2 coils in series and turn the contacts of both contactors 2 on, and a parallel switching circuit to connect the pair of contactor 2 coils in parallel and turn the contacts of both contactors 2 on. The switching circuit 4 detects auxiliary battery 6 voltage via the voltage detection circuit 7. When auxiliary battery 6 voltage is greater than a prescribed voltage, the switching circuit 4 connects the pair of contactor 2 coils in series and switches the contacts on via the series switching circuit. When auxiliary battery 6 voltage is less than a prescribed voltage, the switching circuit 4 connects the pair of contactor 2 coils in parallel and switches the contacts on via the parallel switching circuit.

The car power source apparatus of claim 2 of the present invention is provided with a driving battery 1 having a plurality of batteries connected in series, a first contactor 2a and a second contactor 2b that connect contacts to the positive and negative output sides of the driving battery 1, a switching circuit 4 that switches the contacts of the first contactor 2a and the second contactor 2b on and off, and an auxiliary battery 6 that activates the first contactor 2a and the second contactor 2b coils to switch contactor 2 contacts on and off. The switching circuit 4 is provided with a voltage detection circuit 7 that detects auxiliary battery 6 voltage, switching devices Q1, Q2, Q3, Q4 that are switched on and off by the switching circuit 4, and an intermediate switch that connects contactor 2 coils in series. Two of the switching devices Q1, Q2 are connected to both terminals of the coil of the first contactor 2a to connect the coil of the first contactor 2a to the auxiliary battery 6. Further, two other switching devices Q3, Q4 are connected to both terminals of the coil of the second contactor 2b to connect the coil of the second contactor 2b to the auxiliary battery 6. The intermediate switch 8 is connected to the positive side of the coil of the first contactor 2a and to the negative side of the coil of the second contactor 2b. The switching circuit 4 detects auxiliary battery 6 voltage via the voltage detection circuit 7. When auxiliary battery 6 voltage is less than a prescribed voltage, the switching circuit 4 turns on all switching devices Q1, Q2, Q3, Q4 to connect the coils of the first contactor 2a and the second contactor 2b in parallel with the auxiliary battery 6 via switching devices Q1, Q2, Q3, Q4, thereby turning on the contacts. When auxiliary battery 6 voltage is greater than a prescribed voltage, the switching circuit 4 turns on the switching device Q1 connected to the negative side of the first contactor 2a coil and the switching device Q4 connected to the positive side of the second contactor 2b coil, while turning the other switching devices Q2, Q3 off. Further, the switching circuit 4 turns on the intermediate switch 8 to connect the coils of the first contactor 2a and the second contactor 2b in series with the auxiliary battery 6 via switching devices Q1, Q4, thereby turning on the contacts.

In the car power source apparatus of the present invention, the intermediate switching device 8 can be a diode, and the switching devices Q1, Q2, Q3, Q4 can be FETs (field effect transistors). Further, current limiting resistors R1, R2 can be connected in series with the contactor 2 coils in the car power source apparatus of the present invention.

Further, a pre-charge circuit 3 can be provided in the car power source apparatus of the present invention to reduce charging current when the contactors 2 are on. This pre-charge circuit 3 can be provided with a pre-charge relay 3A that can be switched on prior to switching on the contactors 2. In addition, this power source apparatus can have a pre-charge switching device Q5 connected in series with the pre-charge relay 3A coil to form a series circuit, and that series circuit can be connected in parallel with the series connection of switching device Q3 and the coil of the negative side contactor 2B, which connects contacts to the negative output side of the driving battery 1. With the negative side contactor 2B switched on, pre-charge can be performed by switching the pre-charge relay 3 on.

The car power source apparatus of the present invention has the characteristic that contactors can be properly switched on and off via an auxiliary battery having a highly variable voltage using an extremely simple circuit structure. This is because the power source apparatus of the present invention connects the coils of the first and second contactors in parallel with the auxiliary battery to switch the contactors on when auxiliary battery voltage is low, and connects the coils of the first and second contactors in series with the auxiliary battery to switch the contactors on when auxiliary battery voltage is high. First and second contactor coils connected in parallel with the auxiliary battery are activated with a voltage close to the auxiliary battery voltage. In contrast, contactor coils connected in series with the auxiliary battery are activated with a voltage less than ½ the auxiliary battery voltage. As a result, voltage supplied to contactor coils can be varied over a wide range of voltages via a simple circuit that switches contactor coils between series and parallel connections. This circuit structure can be implemented by an extremely simple circuit compared to a PWM voltage regulator circuit, and the number of circuit elements can be drastically reduced. Therefore, this power source apparatus is characterized by low manufacturing cost. Furthermore, since the voltage supplied to contactor coils can be varied over a wide range, voltage within the range of allowable voltages for proper contactor coil operation can be supplied even when auxiliary battery voltage varies widely.

The above and further objects and features of the invention will more fully be apparent from the following detailed description with accompanying drawings.

DETAILED DESCRIPTION OF THE PREFERRED EMBODIMENTS

Figure 1:
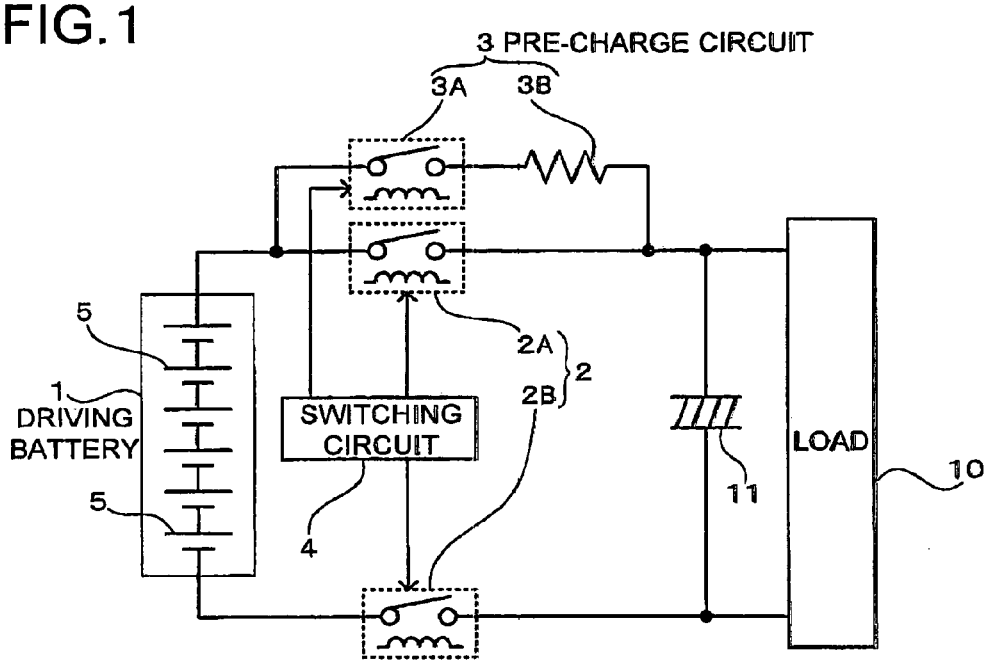
FIG. 1 is an abbreviated structural diagram of one embodiment of a car power source apparatus of the present invention.

The car power source apparatus shown in FIG. 1 is installed on-board a hybrid car or electric automobile and powers, as its load 10, a connected electric motor, which drives the car. The power source apparatus of this figure is provided with a driving battery 1, contactors 2 that connect contacts to the output side of the driving battery 1 to control power supplied to the load 10, a pre-charge circuit 3 that pre-charges the load 10 capacitor 11 prior to switching contactor 2 contacts on, and a switching circuit 4 that switches the pre-charge circuit and contactors 2.

The load 10 has a high capacity capacitor 11 connected in parallel. With the contacts of the contactors 2 in the on state, this capacitor 11 works with the driving battery 1 to supply power to the load 10. In particular, the capacitor 11 supplies high power instantaneously to the load 10. By connecting a capacitor 11 in parallel with the driving battery 1, the amount of instantaneous power supplied to the load 10 can be increased. Since the amount of power that can be supplied to the load 10 from the capacitor 11 is proportional to the capacitance, a capacitor with large capacitance, for example 4000 µF to 6000 µF is used. If the large valued capacitor 11 is connected to high output voltage driving battery 1 in the discharged state, extremely large transient charging current will flow. This is because the impedance of the capacitor 11 is extremely low.

The driving battery 1 powers the electric motor that drives the car. To supply large amounts of power to the motor, the driving battery 1 has many rechargeable batteries 5 connected in series to increase output voltage. Nickel hydrogen batteries or lithium ion rechargeable batteries are used as the rechargeable batteries 5. However, any batteries that can be recharged, such as nickel cadmium batteries can be used as the rechargeable batteries. To supply large amounts of power to the motor, driving battery 1 output voltage is made high, for example, 200V to 400V. However, the power source apparatus can also have a DC/DC converter (not illustrated) connected at the output side of the driving battery to increase battery voltage and supply power to the load. In this case, the number of rechargeable batteries connected in series can be reduced and driving battery output voltage can be lowered. Consequently, driving battery output voltage can be made, for example, 150V to 400V.

The pre-charge circuit 3 pre-charges the capacitor 11 to reduce the flow of charging current through the contacts of contactors 2 switched to the on state. The pre-charge circuit 3 is provided with a pre-charge resistor 3B and a pre-charge relay 3A. The contacts of the pre-charge relay 3A and the pre-charge resistor 3B are connected in series, and that series connection is in turn connected in parallel with the contacts of the positive side contactor 2A. The pre-charge resistor 3B limits pre-charge current to the load 10 capacitor 11. The resistance of the pre-charge resistor 3B can be increased to reduce pre-charge current. For example, in a power source apparatus with a pre-charge resistor 3B value of 10 Ω and a driving battery 1 output voltage of 400V, maximum pre-charge current becomes 40 A. Maximum pre-charge current can be reduced by increasing the pre-charge resistor 3B value. Pre-charge resistor value is, for example, set to 5 Ω to 20 Ω, preferably set to 6 ΩL to 18 Ω, and more preferably set to 6 Ω to 15 Ω. In the pre-charge circuit 3, the contacts of the pre-charge relay 3A are turned on to pre-charge the capacitor 11.

A contactor 2 is a relay having contacts that are switched on by supplying electric power to a coil. The power source apparatus maintains the contacts of the positive side contactor 2A (connected to the positive side output terminal) in the off state, switches the contacts of the negative side contactor 2B (connected to the negative side output terminal) to the on state, and pre-charges the capacitor 11 via the pre-charge circuit 3 under these conditions. After pre-charging the capacitor 11, the contacts of the positive side contactor 2A are switched from off to on, and the driving battery 1 is connected to the load 10. Subsequently, the pre-charge relay 3A of the pre-charge circuit 3 is switched off. When contactors 2 in the on state are switched off, both contactors 2 are turned off simultaneously.

The contactors 2 and the pre-charge relay 3A are switched on and off by the switching circuit 4. The switching circuit 4 is provided with a voltage detection circuit 7 that detects auxiliary battery 6 voltage, switching devices Q1, Q2, Q3, Q4 that are switched on and off via the voltage detection circuit 7, and an intermediate switch 8 that connects contactor 2 coils in series.

Two of the switching devices Q1, Q2 are connected on either side of the first contactor 2a coil, and operate to connect the first contactor 2a coil to the auxiliary battery 6. In the switching circuit 4 of the figures, switching device Q1 is connected to the negative side of the coil of the first contactor 2a, and switching device Q2 is connected to the positive side. Two other switching devices Q3, Q4 are connected on either side of the second contactor 2b coil, and operate to connect the second contactor 2b coil to the auxiliary battery 6. In the switching circuit 4 of the figures, switching device Q3 is connected to the negative side of the coil of the second contactor 2b, and switching device Q4 is connected to the positive side. Switching devices Q1, Q2, Q3, Q4 are FETs (field effect transistors). However, bipolar or other transistors can also be used as the switching devices. In addition, the switching circuit 4 of the figures has current limiting resistors R1, R2 connected in series with the contactor 2 colts. When contactor 2 coils are connected in parallel with the auxiliary battery 6, current limiting resistors R1, R2 limit current flowing through contactor 2 coils. Current limiting resistors R1, R2 are connected at locations such that no current flows through them when contactor 2 coils are connected in series with the auxiliary battery 6. In the switching circuit 4 of FIG. 2, switching devices Q1, Q4 are turned on and switching devices Q2, Q3 are turned off to connect the coils of the first and second contactors 2a, 2b in series. The positive side of the first contactor 2a coil and the negative side of the second contactor 2b coil are connected via the intermediate switch 8 to connect the coils in series. When contactor 2 coils are connected in series (series configuration), the positive side of the first contactor 2a coil is not connected to the power supply (auxiliary battery 6) by the switching device Q2. Similarly, the negative side of the second contactor 2b coil is not connected to the power supply by the switching device Q3. The current limiting resistor R1 is connected in a circuit leg that is not connected to the power supply in the series configuration, namely it is connected between the positive side of the first contactor 2a coil and the power supply. In the switching circuit 4 of the figures, current limiting resistor R1 is connected between the positive side of the first contactor 2a coil and the switching device Q2. Similarly, the current limiting resistor R2 is connected between the negative side of the second contactor 2b coil and the power supply. In the switching circuit 4 of the figures, current limiting resistor R2 is connected between the negative side of the second contactor 2b coil and the switching device Q3.

Figure 2:
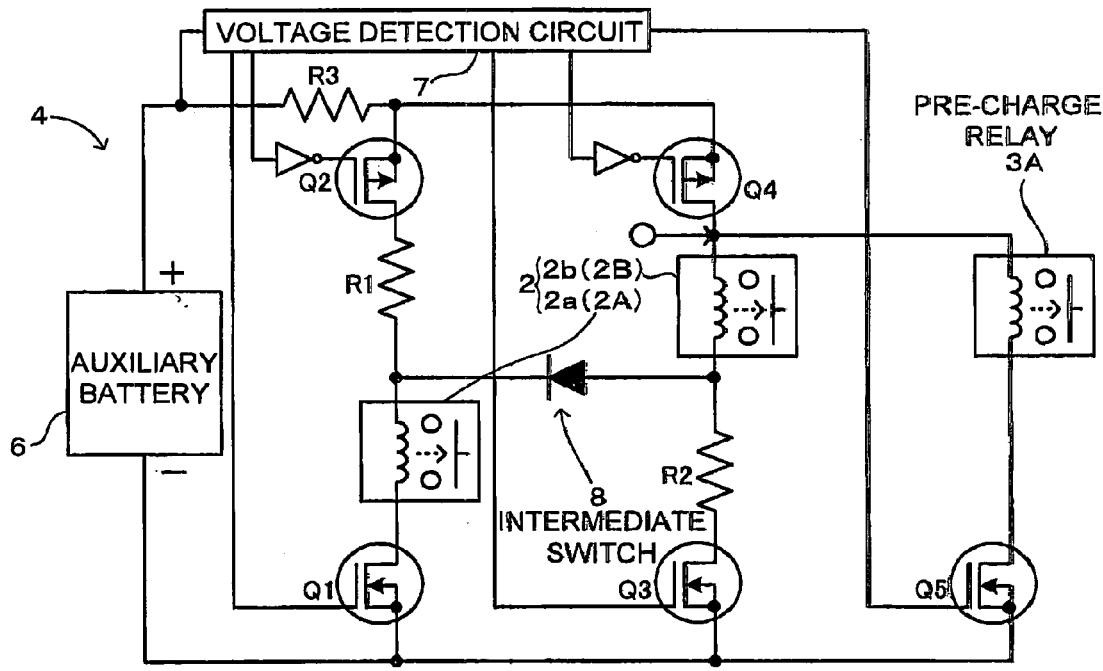
FIG. 2 is a circuit diagram of the switching circuit of the car power source apparatus shown in FIG. 1.

Further, in the switching circuit 4 of FIG. 2, the power supply (auxiliary battery 6) is connected to switching devices Q2, Q4 via a series resistor R3. This series resistor R3 adjusts current flowing in contactor 2 coils when the contactor 2 coils are connected in either the series or parallel.

The series resistor R3 adjusts current flowing through contactor 2 coils connected either in series or parallel to prescribed current levels. For example, the series resistor R3 is made 0 Ω to 10 Ω), and preferably is made 0 Ω to 5 Ω. Current limiting resistors R1, R2 regulate current flowing through contactor 2 coils connected in parallel to prescribed current levels, and are also set, for example, to 0 Ω to 10 Ω, and preferably to 0 Ω to 5 Ω. Finally, for the case where even zero resistance is suitable, series resistor R3 may also be eliminated.

The intermediate switch 8 connects the coils of the first contactor 2a and the second contactor 2b in series with the auxiliary battery 6. In the switching circuit 4 of FIG. 2, the intermediate switch 8 is a diode. The diode intermediate switch 8 is connected to pass current in a direction from the contactor 2 coil connected to the positive side of the auxiliary battery 6 to the contactor 2 coil connected to the negative side. The diode intermediate switch 8 of the figures is connected to the positive side of the first contactor 2a coil and the negative side of the second contactor 2b coil, and is connected with a polarity to pass current from the second contactor 2b coil to the first contactor 2a coil. When the switching devices Q1, Q4 are turned on, the diode intermediate switch 8 connects the coils of the first and second contactors 2a, 2b In series with the auxiliary battery 6.

When the coils of the first contactor 2a and the second contactor 2b are connected in parallel to the auxiliary battery 6, the intermediate switch 8, which is a diode, is reverse biased and current does not flow through it. Here, the real component of contactor coil impedance is greater than the current limiting resistor value (assuming equal on-resistance for all switching devices). Current does not flow because the diode is connected to the positive side of the first contactor 2a coil and the negative side of the second contactor 2b coil. In this power source apparatus, when switching devices Q1, Q2, Q3, Q4 are in the on state, potential at the positive side of the first contactor 2a coil is nearly equal to the potential at the positive side of the auxiliary battery 6, and potential at the negative side of the second contactor 2b coil is nearly equal to the potential at the negative side of the auxiliary battery 6 Therefore, potential at the positive side of the first contactor 2a coil is higher than potential at the negative side of the second contactor 2b coil, and the diode is reverse biased. Consequently, when the coils of the first and second contactors 2a, 2b are connected in series, the diode intermediate switch 8 is in the on state and passes current, and when the coils of the first and second contactors 2a, 2b are connected in parallel, the diode is in the off state and cuts-off current flow. The off state diode does not connect the parallel connected coils of the first and second contactors 2a, 2b. Therefore, the parallel connected coils of the first and second contactors 2a, 2b have no mutual connection, and are independently connected to the auxiliary battery 6.

A diode intermediate switch 8 is not forced to turn on or off by an external signal as required by devices such as bipolar transistors, FETs, or relays. The diode intermediate switch 8 is switched on by series connection of the contactor 2 coils and off by parallel connection of the contactor 2 coils. Therefore, the intermediate switch 8 and circuitry to practically implement its on and off switching can be extremely simple. However, the intermediate switch of the power source apparatus of the present invention is not limited to a diode. A semiconductor switching device such as a bipolar transistor or an FET, or a relay can be used in place of a diode as the intermediate switch.

Figure 3:
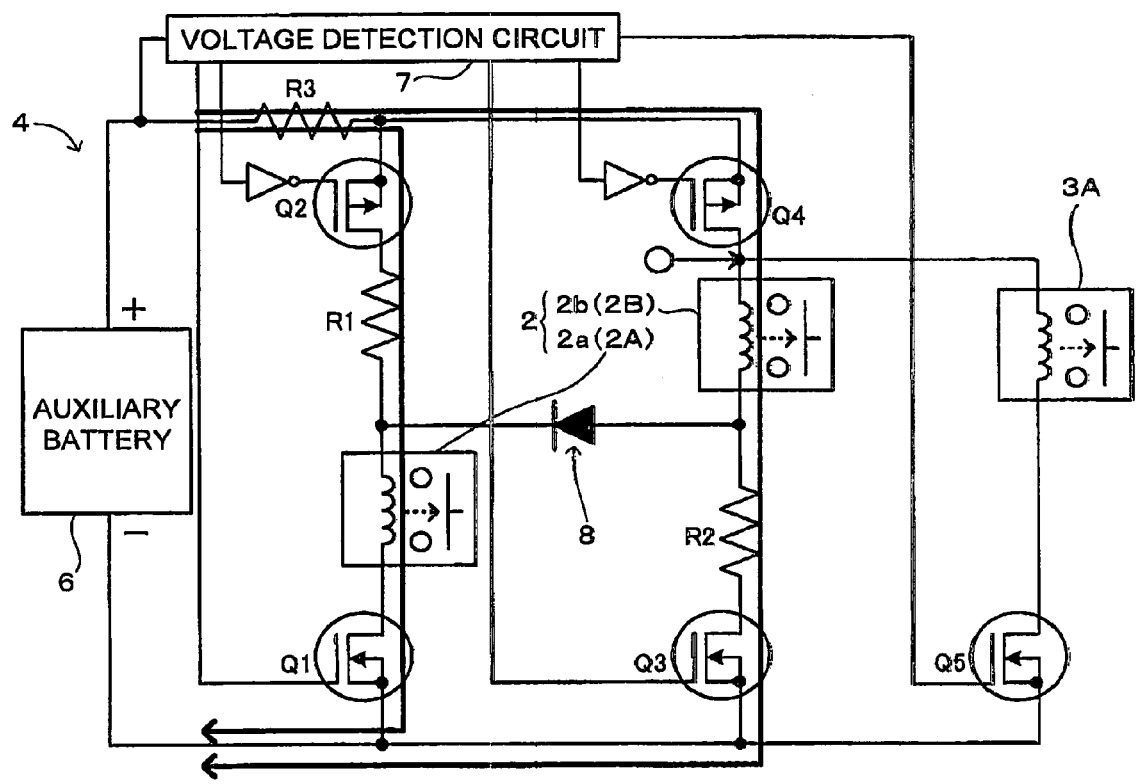
FIG. 3 is a diagram of the switching circuit shown in FIG. 2 with contactor coils connected in parallel.
Figure 4:
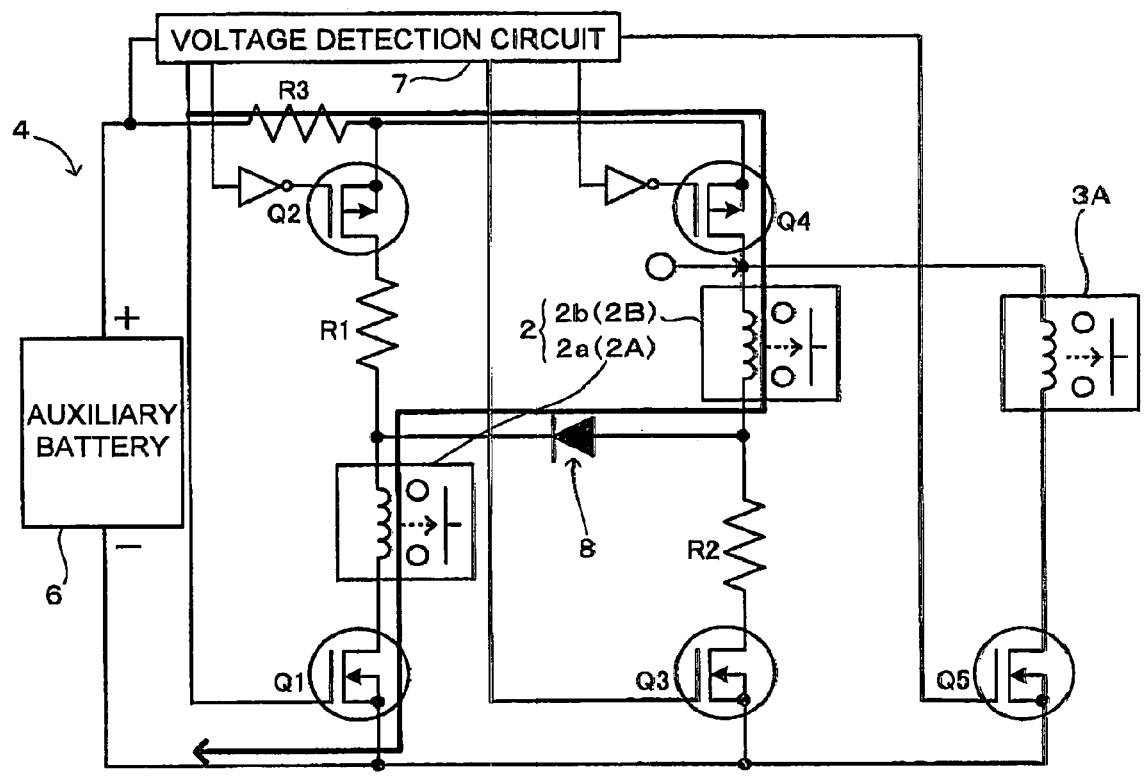
FIG. 4 is a diagram of the switching circuit shown in FIG. 2 with contactor coils connected in series.

The switching devices Q1, Q2, Q3, Q4 are switched on and off by the switching circuit 4. The switching circuit 4 changes the conditions of power application to turn on contactor 2 coils depending on auxiliary battery 6 voltage. When auxiliary battery 6 voltage is low, the coils of the first and second contactors 2a, 2b are connected in parallel to the auxiliary battery 6 as shown by the arrows of FIG. 3. Conversely, when auxiliary battery 6 voltage is high, the coils of the first and second contactors 2a, 2b are connected in series with the auxiliary battery 6 as shown by the arrows of FIG. 4. The switching circuit 4 is provided with a voltage detection circuit 7 to detect auxiliary battery 6 voltage. The voltage detection circuit 7 detects auxiliary battery 6 voltage, and when auxiliary battery 6 voltage is lower than a set voltage, it turns on all the switching devices Q1, Q2, Q3, Q4 to connect the coils of the first and second contactors 2a, 2b in parallel with the auxiliary battery 6 and switch on contactor 2 contacts via the switching devices Q1, Q2, Q3, Q4 as shown by the arrows of FIG. 3. When auxiliary battery 6 voltage is higher than the set voltage, the voltage detection circuit 7 turns on the switching device Q1 connected to the negative side of the first contactor 2a coil and the switching device Q4 connected to the positive side of the second contactor 2b coil, it turns off the other switching devices Q2, Q3, and it puts the diode intermediate switch 8 in a conducting state to connect the coils of the first and second contactors 2a, 2b in series with the auxiliary battery 6 and switch on contactor 2 contacts via the switching devices Q1, Q4 as shown by the arrow of FIG. 4.

A pre-charge switching device Q5 is switched on and off by the voltage detection circuit 7 to control power to the coil of the pre-charge relay 3A and pre-charge the load capacitor (not illustrated in FIGS. 2-4). When the capacitor is pre-charged, contacts of the negative side contactor 2B, which are connected to the negative side output terminal, are switched on, and contacts of the positive side contactor 2A, which are connected to the positive side output terminal, are switched off. After pre-charge completion, contacts of the positive side contactor 2A, which are connected to the positive side output terminal, are switched on. Therefore, when the ignition switch is turned on, the pre-charge switching device Q5 is switched on together with the negative side contactor 2B. In the switching circuit 4 of FIG. 2, the pre-charge switching device Q5 is connected in series with the pre-charge relay 3A coil, and this series connection is in turn connected in parallel with the series connection of the coil of the negative side contactor 2B, which connects its contacts with the negative side output terminal, and the switching device Q3. When the negative side contactor 2B is switched on, the pre-charge relay 3A is also switched on to pre-charge the capacitor 11. After the capacitor 11 is pre-charged, contacts of the positive side contactor 2A, which connect to the positive side output terminal, are switched on, and subsequently, the pre-charge switching device Q5 is turned off to turn off the pre-charge relay 3A.

The voltage detection circuit 7 inputs on and off signals to the switching devices Q1, Q2, Q3, Q4 and the pre-charge switching device Q5 to switch those devices on and off. The switching devices Q1, Q2, Q3, Q4 and the pre-charge switching device Q5 are switched on by an on-signal input and switched off by an off-signal input.

Figure 5:
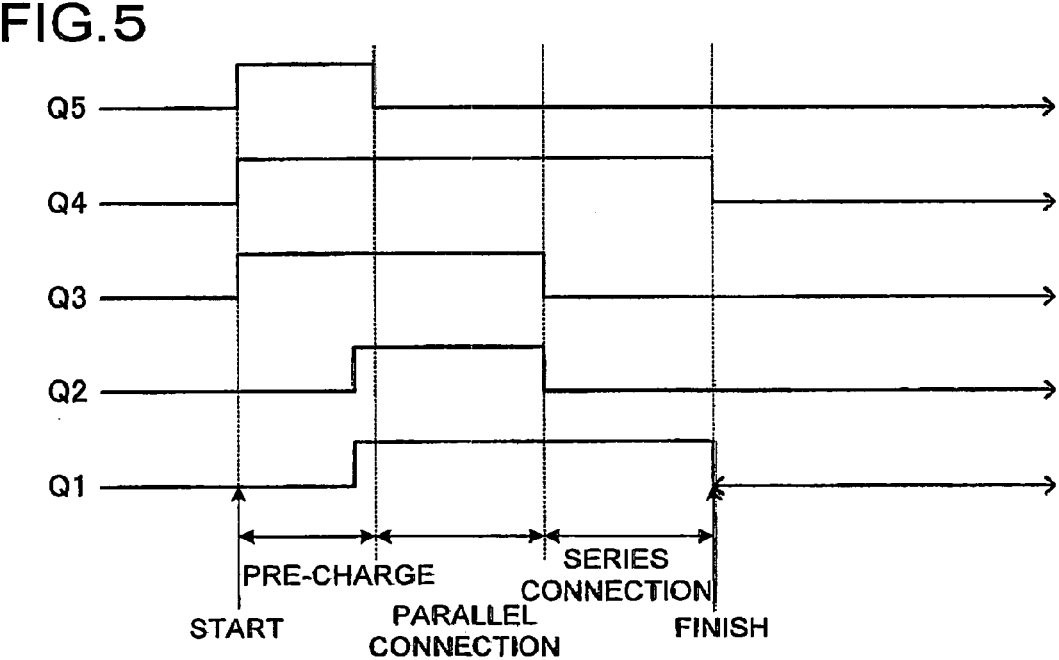
FIG. 5 is a timing chart of voltage detection circuit on and off switching of the switching devices

FIG. 5 shows a timing chart of voltage detection circuit 7 switching the switching devices Q1, Q2, Q3, Q4 and the pre-charge switching device Q5 on and off. This timing chart shows pre-charging of the capacitor 11 connected to the load 10 immediately after the ignition switch is turned on, subsequent switching to turn the contacts on with the first and second contactor 2a, 2b coils connected in parallel, and finally switching to turn the contacts on with the coils connected in series.

(1) Pre-Charge Step

When the ignition switch is switched on, the capacitor 11 connected in parallel with the load 10 is pre-charged. At this time, the voltage detection circuit 7 turns on switching devices Q3, Q4 and pre-charge switching device Q5, and turns off switching devices Q1, Q2. When switching devices Q3, Q4 are in the on state, they switch the second contactor 2b on. When the second contactor 2b is turned on, it switches on contacts connected to the negative side output terminal. Switching devices Q1, Q2, which are in the off state, maintain the first contactor 2a in the off state. In addition, the pre-charge switching device Q5 switches the pre-charge relay 3A on to pre-charge the capacitor 11 via the pre-charge resistor 3B.

(2) Parallel Connection Step

Since auxiliary battery 6 voltage is lower than the set voltage for this step, switching devices Q1, Q2, Q3, Q4 are turned on, and pre-charge switching device Q5 is turned off. However, the pre-charge switching device Q5 is switched off with a delay after the switching devices Q1, Q2 are turned on. Since all switching devices Q1, Q2, Q3, Q4 are switched on, first and second contactor 2a, 2b coils are connected in parallel with the auxiliary battery 6, as shown by the arrows of FIG. 3, and the first contactor 2a and the second contactor 2b are thereby turned on. First and second contactor 2a, 2b coils connected in parallel with the auxiliary battery 6 are supplied by sufficient voltage even when auxiliary battery 6 voltage has become low. In this configuration, contactor 2 coil current is adjusted by the current limiting resistors R1, R2. When contactors 2 are switched on in this configuration, contactor 2 contacts, which are connected to positive and negative output terminals, are put in the on state, and driving battery 1 charging and discharging is possible.

In the pre-charge step (1) and parallel connection step (2) when the switching devices Q3, Q4 are on, current is limited by flowing through the current limiting resistor R2. For the purpose of eliminating that current limiting, a switch (FET) across the current limiting resistor R2 (not illustrated), which can short circuit R2, is provided. This type of switch is controlled on and off by commands from the voltage detection circuit 7. Similarly, when switching devices Q1, Q2 are on in the parallel connection step (2), a switch (FET, not illustrated) that can short circuit current limiting resistor R1 is provided. This type of switch is also controlled on and off by commands from the voltage detection circuit 7.

(3) Series Connection Step

Next, the auxiliary battery 6 is charged and its voltage becomes higher than the set voltage. When this occurs, the voltage detection circuit 7 maintains the switching devices Q1, Q4 in the on state, and switches switching devices Q2, Q3 off. The pre-charge switching device Q5 is maintained in the off state. In this configuration, the first and second contactor 2*a*, 2*b* coils are connected in series with the auxiliary battery 6, as shown by the arrow in FIG. 4. First and second contactor 2*a*, 2*b* coils connected in series are supplied a divided-down voltage that is ½ the auxiliary battery 6 voltage. Therefore, even when auxiliary battery 6 voltage becomes high, contactor 2 coil voltage does not exceed the maxi mum rated voltage.

The timing chart described above indicates conditions for switching on contactors 2 when auxiliary battery 6 voltage is lower than the set voltage during ignition switch turn-on and pre-charge. However, if auxiliary battery 6 voltage is higher than the set voltage during ignition switch turn-on and pre-charge, step (2) is skipped after step (1) and step (3) is performed to switch contactor 2 contacts on.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims. This application is based on Application No. 2004-292,793 filed in Japan on Oct. 5, 2004, the content of which is incorporated hereinto by reference.

What is claimed is:

1. A car power source apparatus comprising a driving battery (1) having a plurality of batteries connected in series, a pair of contactors (2) to connect contacts to the positive and negative output sides of the driving battery (1), a switching circuit (4) to switch the pair of contactors (2) on and off, and an auxiliary battery (6) to electrically power contactor (2) coils and switch contactor (2) contacts on and off;

the switching circuit (4) is provided with a voltage detection circuit (7) to detect auxiliary battery (6) voltage, a series switching circuit to connect coils of the pair of contactors (2) in series and switch both contactor (2) contacts on, and a parallel switching circuit to connect coils of the pair of contactors (2) in parallel and switch both contactor (2) contacts on; wherein the switching circuit (4), detects auxiliary battery (6) voltage via the voltage detection circuit (7), when auxiliary battery (6) voltage is higher than a set voltage, it connects the pair of contactor (2) coils in series to switch the contacts on via the series switching circuit, and when auxiliary battery (6) voltage is lower than a set voltage, it connects the pair of contactor (2) coils in parallel to switch the contacts on via the parallel switching circuit.

2. A car power source apparatus as recited in claim 1 wherein the switching circuit (4), comprising a series switching circuit to connect coils of the pair of contactors (2) in series and switch both contactor (2) contacts on, and a parallel switching circuit to connect coils of the pair of contactors (2) in parallel and switch both contactor (2) contacts on, is provided with switching devices (Q1), (Q2), (Q3), (Q4) that are switched on and off by the voltage detection circuit (7), and an intermediate switch (8) that connects contactor (2) coils in series;

two switching devices (Q1), (Q2) are connected to both terminals of the coil of a first contactor (2*a*) to connect the first contactor (2*a*) coil to the auxiliary battery (6);

another two switching devices (Q3), (Q4) are connected to both terminals of the coil of a second contactor (2*b*) to connect the second contactor (2*b*) coil to the auxiliary battery (6);

an intermediate switch (8) is connected to the positive side of the first contactor (2*a*) coil and the negative side of the second contactor (2*b*) coil;

the switching circuit (4), detects auxiliary battery (6) voltage via the voltage detection circuit (7), when auxiliary battery (6) voltage is lower than the set voltage, it turns on all switching devices (Q1), (Q2), (Q3), (Q4) to connect the first contactor (2*a*) coil and second contactor (2*b*) coil in parallel with the auxiliary battery (6) via the switching devices (Q1), (Q2), (Q3), (Q4) and switch the contacts on;

when auxiliary battery (6) voltage is higher than the set voltage, the switching circuit (4) turns on the switching device (Q1) connected to the negative side of the first contactor (2*a*) coil and the switching device (Q4) connected to the positive side of the second contactor (2*b*) coil, it turns off the other switching devices (Q2), (Q3), and it turns on the intermediate switch (8) to connect the first contactor (2*a*) coil and second contactor (2*b*) coil in series with the auxillary battery (6) via the switching devices (Q1), (Q4) and switch the contacts on.

3. A car power source apparatus as recited in claim 2 wherein the first contactor (2*a*) and the second contactor (2*b*) are connected to the positive and negative output sides.

4. A car power source apparatus as recited in claim 2 wherein the intermediate switch (8) is a diode.

5. A car power source apparatus as recited in claim 2 wherein the switching devices (Q1), (Q2), (Q3), (Q4) are FETs (field effect transistors).

6. A car power source apparatus as recited in claim 2 wherein current limiting resistors (R1), (R2) are connected in series with contactor (2) coils.

7. A car power source apparatus as recited in claim 6 wherein current limiting resistors (R1), (R2) are connected in a location where current does not flow through the resistors when contactor (2) coils are connected in series with the auxiliary battery (6).

8. A car power source apparatus as recited in claim 7 wherein the current limiting resistor (R1) is connected between the positive side of the first contactor (2*a*) coil and the switching device (Q2), and the current limiting resistor (R2) is connected between the negative side of the second contactor (2*b*) coil and the switching device (Q3).

9. A car power source apparatus as recited in claim 6 wherein the electrical resistance of the current limiting resistors (R1), (R2) is 0 Ω to 10 Ω.

10. A car power source apparatus as recited in claim 1 wherein a pre-charge circuit (3) is provided to reduce charging current when contactors (2) are turned on.

11. A car power source apparatus as recited in claim 10 wherein the pre-charge circuit (3) is provided with a pre-charge relay (3A), which is switched on before the contactors (2); the series connection of the pre-charge relay (3A) coil and a pre-charge switching device (Q5) is in turn connected in parallel with the series connection of the coil of the negative side contactor (2B), which connects its contacts with the negative side output terminal, and the switching device (Q3), and the pre-charge relay (3A) is switched on to perform pre-charge with the negative side contactor (2B) switched to the on state.

\* \* \* \* \*